United States Patent [19]
Mickish et al.

[11] Patent Number: 5,633,100
[45] Date of Patent: May 27, 1997

[54] HOLOGRAPHIC IMAGING USING FILTERS

[75] Inventors: Daniel J. Mickish, Wilmington; Steven R. MacKara, New Castle; Torence J. Trout, Yorklyn, all of Del.

[73] Assignee: E. I. Du Pont de Nemours and Company, Wilmington, Del.

[21] Appl. No.: 799,138

[22] Filed: Nov. 27, 1991

[51] Int. Cl.⁶ ........................................ G03H 1/02
[52] U.S. Cl. .................... 430/1; 430/2; 359/1; 359/3; 359/30; 359/15
[58] Field of Search ........................ 430/1, 2; 359/1, 359/3, 30, 28, 32, 15

[56] References Cited

U.S. PATENT DOCUMENTS

| | | | |
|---|---|---|---|
| 1,305,195 | 5/1919 | Cocanari | 430/510 |
| 3,532,406 | 10/1970 | Hartman | 350/3.5 |
| 3,833,383 | 9/1974 | Ryan et al. | 96/84 R |
| 4,458,978 | 7/1984 | Arns et al. | 359/30 |
| 4,888,260 | 12/1989 | Cowan | 430/2 |
| 4,917,977 | 4/1990 | Smothers | 430/2 |
| 4,950,567 | 8/1990 | Keys et al. | 430/2 |
| 4,953,923 | 9/1990 | Wreede | 350/3.61 |
| 5,142,385 | 8/1992 | Anderson et al. | 359/1 |

FOREIGN PATENT DOCUMENTS

| | | | |
|---|---|---|---|
| 0043993 | 1/1982 | European Pat. Off. | 430/2 |
| 5831371 | 2/1983 | Japan | 430/1 |
| 1118881 | 8/1989 | Japan | 430/2 |
| 1-231082 | 9/1989 | Japan | 430/1 |
| 2-89080 | 3/1990 | Japan | 430/2 |
| 2-140787 | 5/1990 | Japan | 430/1 |

OTHER PUBLICATIONS

Appl. Opt. 7(7)(Jul. 1968) Dreskin et al. pp. 1404–1405.
Translation of JP 1–231082.

*Primary Examiner*—Martin Angerbranndt
*Attorney, Agent, or Firm*—Thomas H. Magee

[57] ABSTRACT

This invention relates to a process for forming a reflection hologram. A process for forming a volume reflection hologram is provided wherein the formation of secondary holograms is suppressed by the placement of index matched filters contiguous to at least one surface of the photosensitive recording element during formation of the hologram.

11 Claims, 2 Drawing Sheets

HOLOGRAPHIC IMAGING USING FILTERS

FIELD OF THE INVENTION

This invention relates to a process for forming a reflection hologram. More particularly this invention relates to a process for forming a volume reflection hologram wherein the formation of secondary holograms is suppressed by the placement of index matched filters contiguous to both surfaces of the photosensitive recording element during formation of the hologram.

BACKGROUND OF THE INVENTION

In making a reflection hologram, a photosensitive recording element is exposed to two beams of coherent radiation that enter the recording element from opposite sides. One beam, generally referred to as the reference beam, interferes with the other beam, generally referred to as the object beam, which contains the information to be recorded. The intersecting beams produce an interference pattern that is recorded within the photosensitive element by modulating the refractive index throughout the volume. Such holograms are known as volume holograms because the interference pattern is recorded throughout the volume, rather than on the surface, of the recording material.

Reflection holograms may be produced by two well-known methods. In the "on-axis" method a beam of coherent radiation is projected through the photosensitive element onto an object behind the element. The radiation reflected by the object returns and interferes with the incident projected beam in the plane of the recording medium. Reflection holograms also may be produced by an "off-axis" method wherein a reference beam is projected on one side of the photosensitive element and an object beam is projected on the reverse side of the element. Reflection holograms produced by an off-axis process are disclosed in Hartman, U.S. Pat. No. 3,532,406.

Undesired images produced in the recording process are a serious problem in the recording and duplicating of reflection holograms. A portion of the incident beam is reflected at the front and back surfaces of the recording medium. These reflected beams interact with the incident beam to form secondary holograms. Such secondary holograms produce a loss of image quality ("noise"), in the final hologram. Image brightness is also decreased.

Ryan, U.S. Pat. No. 3,833,383, discloses the use of an antihalation layer to prevent the formation of secondary holograms. The antihalation layer is opaque to radiation, however, so only the side of the photosensitive element opposite the antihalation layer can be exposed to radiation. Consequently, this technique is useful only in processes in which both beams are incident on the same side of the photosensitive element, i.e., recording of transmission holograms.

Anti-reflection layers and anti-reflection coated plates, coupled to the photosensitive element with index matching fluids, have been used to reduce noise. However, such layers and plates are expensive and difficult to use. They are wavelength and angle specific so that a different layer or plate is required for each significantly different imaging wavelength and angle. In addition, they provide only a partial solution. Although noise is reduced to some extent, enough remains that quality of the hologram may be affected. Thus, a need exists for a simple, relatively inexpensive process for reducing the noise in recording reflection holograms.

SUMMARY OF THE INVENTION

The present invention provides an improved process for suppressing the noise formed in recording a reflection hologram. More specifically, the present invention provides, in a process for recording a reflection hologram wherein an object beam and a reference beam are incident on opposing surfaces of a photosensitive element to form a volume hologram therein, the improvement wherein formation of secondary holograms is suppressed by the placement of an index matched filter contiguous to at least one surface of the photosensitive element during formation of the hologram.

DETAILED DESCRIPTION OF THE INVENTION

Exposure of the Photosensitive Element

A coherent light source, typically a laser, is employed to record a hologram in the photosensitive medium. Tunable lasers frequently are used to image photosensitive media sensitized across the visible spectrum. It is frequently desired to record the hologram, or to make a holographic optical element, with the same wavelength of radiation as that used for reconstruction. Examples are diffraction gratings, mirrors, and lenses. Tunable lasers offer the flexibility of recording the hologram, or making a holographic optical element, at any desired wavelength or at more than one wavelength.

Many wavelength tunable laser sources are now practical and can be used for holography. The dye laser, for example, can operate at any wavelength from the ultraviolet to the infrared by the proper choice of pump source and dye medium. Dye laser systems can be pulsed with pulses of light as short as a few femtoseconds or can operate in the continuous wave mode. Continuous wave dye lasers with linear and ring cavity configurations can be pumped by other lasers, for example argon and krypton ion lasers, resulting in high average power. The bandwidth of the dye lasers can be narrowed with the use of intracavity etalons resulting in long coherence lengths. Advantages of these laser systems are the added control of wavelength and coherence length.

Figure 1:
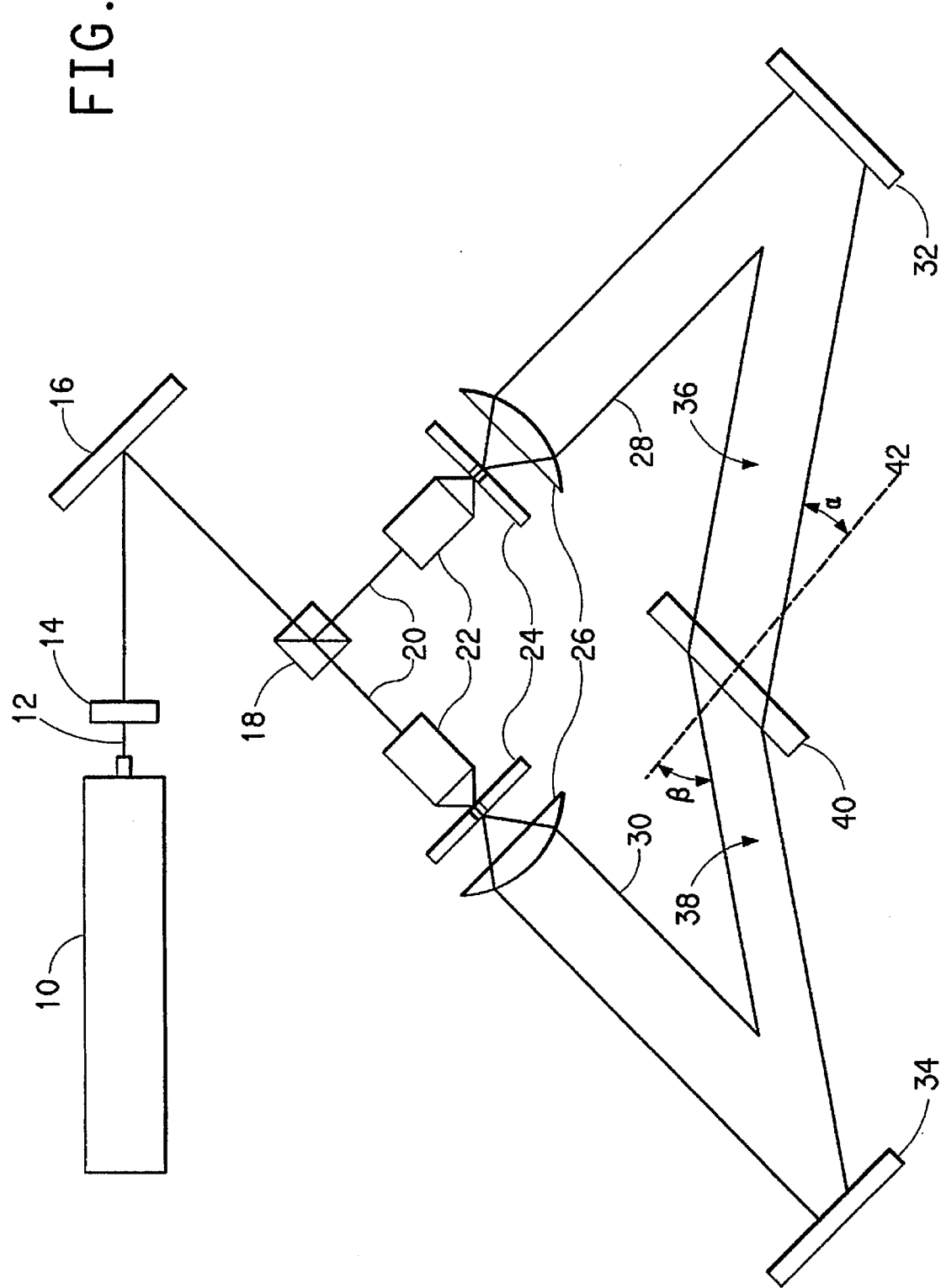
FIG. 1 illustrates an off-axis method of forming a holographic mirror.

A non-magnifying holographic mirror is the simplest reflection hologram. It can be created by splitting a single laser beam and recombining the resulting beams at the recording medium. Referring to FIG. 1, using the "off-axis" technique, a holographic mirror may be formed in a photosensitive element by exposing the element to the intersection of two counter-propagating laser beams. The laser (10) produces a laser beam (12) controlled by a shutter (14). Laser beam (12) is directed by a mirror (16) into a beam splitter (18) wherein the beam is divided into two beam segments (20). Beam segments (20) pass through microscope objectives (22), pinholes (spatial filter) (24), and collimating lens (26) to produce two expanded, collimated beams (28) and (30). Expanded, collimated beams (28) and (30) are reflected by mirrors (32) and (34) to produce reference beam (36) and object beam (38) which converge in photosensitive element (40). The angle between reference beam (36) and a line (42) normal to the the surface of photosensitive element (40) is designated alpha. The angle between object beam (38) and a line (42) normal to the the surface of photosensitive element (40) is designated beta.

Either reference beam (36) or object beam (38) may be reflected from an object, transmitted through an object, passed through a transmission hologram, reflected from a reflection hologram, or otherwise modulated by conventional holographic recording techniques to record an image other than a mirror. In a conventional holographic recording process only one beam is so modulated. The modulated beam is conventionally designated the object beam while the unmodulated beam is designated the reference beam. Techniques for making reflection holograms are disclosed in Hartman, U.S. Pat. No. 3,532,406. Useful apparatus for copying reflection holograms is disclosed in U.S. Pat. No. 4,995,685 to Armstrong et al.

As shown in FIG. 1, if a holographic mirror is being recorded, neither beam is modulated. The beams are substantially identical, typically varying only in intensity, if at all. When a holographic mirror is recorded one beam is arbitrarily designated the reference beam and the other collimated beam the object beam.

Alternatively, the "on-axis" method may be used for imaging the photosensitive element. In this method a beam of coherent radiation is projected onto one surface of a photosensitive element, typically at an angle 70° or less from the normal to the photosensitive element. A portion of this beam is transmitted through the photosensitive element and is reflected back by a object mounted behind the element. Interaction of the incident beam (i.e., the reference beam) and the reflected beam (i.e., the object beam) forms a reflection hologram in the element. If the mounted object is a mirror, a holographic mirror is formed. If the object is a reflection hologram, a copy of the reflection hologram is formed.

Figure 2A:
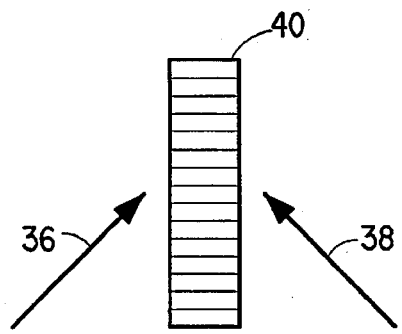
FIG. 2 illustrates prior art methods for recording a reflection hologram.

FIG. 2 illustrates prior art methods for recording a reflection hologram. Referring to FIG. 2a, reference beam (36) and object beam (38) are incident on photosensitive element (40) as in a conventional process for forming a reflection hologram.

Figure 2B:
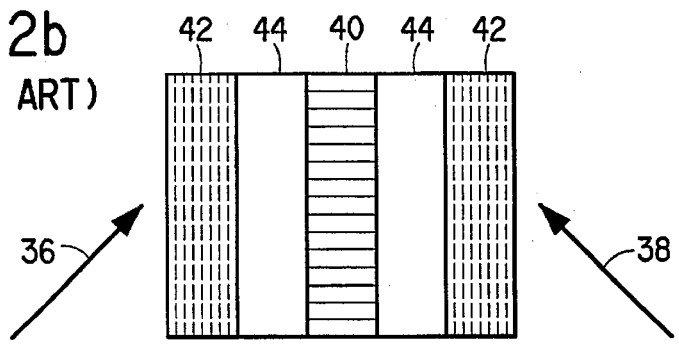

Referring to FIG. 2b, anti-reflection plates (42), coupled by index matching fluids (44), are placed on either side of photosensitive element (40). Reference beam (36) and object beam (38) each pass through an anti-reflection plate (42) and index matching fluid (44) before striking photosensitive element (40). The anti-reflection plates typically are transparent plates, such as glass or quartz, that bear an antireflection coating on the side that does not contact the index matching fluid. The anti-reflection coating has a refractive index selected such that portions of beams 36 and 38 that have passed through the photosensitive element also pass through the coating, with as little of the beams as possible being reflected back into the photosensitive element where they are recorded as noise. Referring back to FIG. 2a, beams 36 and 38 will be more strongly reflected back into the photosensitive element from the air interface if anti-reflection plates are not employed.

Figure 3A:
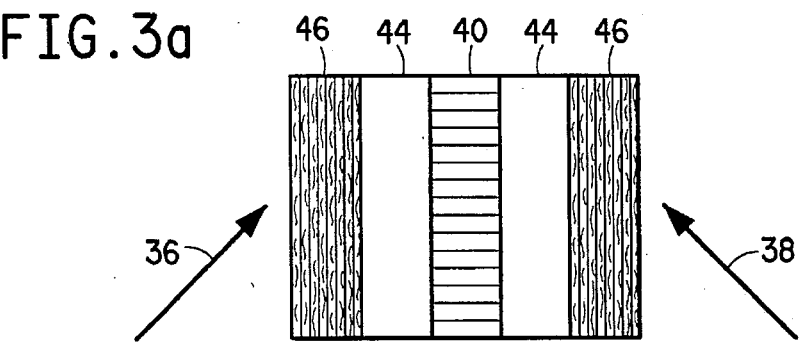
FIG. 3 illustrates the improved holographic recording processes of this invention.

FIG. 3 illustrates the improved holographic recording process of this invention. Referring to FIG. 3a, a filter (46), coupled by index matching fluid (44) has been placed on either side of photosensitive element (40). Reference beam (36) and object beam (38) each pass through filter (46) and index matching fluid (44) before striking photosensitive element (40). The index matching fluid has a refractive index such that there is no significant reflection of beams 36 or 38 after they have passed through the photosensitive recording element and enter into the filters, and thus reflection at this interface is minimized. After passing through the photosensitive element, the beam continues into the filter, where it is absorbed as described hereinafter. Any portion of the beam that reflects back at the air interface passes through the absorbing filter a second time before reentering the photosensitive element. The residual back-reflected beams are extremely weak, resulting in very little noise being recorded.

Figure 3B:
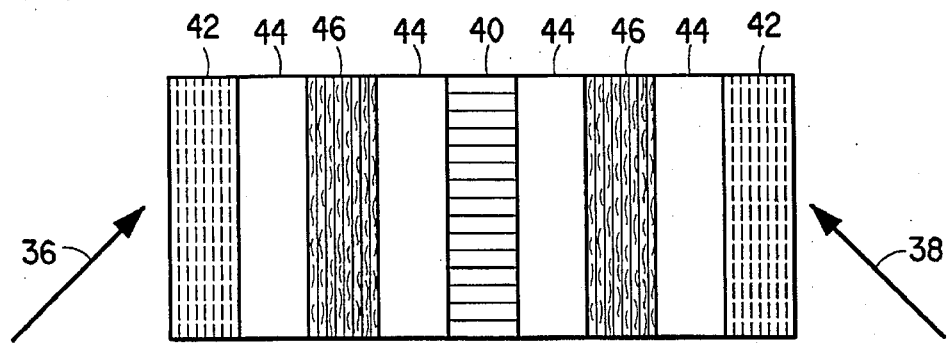

Referring to FIG. 3b, which illustrates another embodiment of this invention, an anti-reflection plate (42) coupled by index matching fluid (44), and a filter (46) coupled by index matching fluid (44), have been placed on either side of photosensitive element (40). Reference beam (36) and object beam (38) each pass through anti-reflection plate (42), index matching fluid (44), filter (46), and index matching fluid (44) before striking photosensitive element (40). Alternatively, in place of anti-reflection plate (42), filter (46) may have an anti-reflection coating.

Filter (46) absorbs a portion of the reflected radiation so that the formation of secondary holograms is suppressed (i.e., reduced). Any type of filter may be used that absorbs radiation that has passed through the photosensitive element and particularly the reflected radiation, but does not adversely effect the holographic recording process. Such filters include, for example, neutral density filters, solutions of absorbing dyes, and glass absorption filters, such as those manufactured by Corning Glass Works, Corning, N.Y. Absorption filters, such as dye solutions and glass absorption filter, generally have their absorbance maxima in a narrow wavelength region of the spectrum. A different filter is required for each significantly different imaging wavelength. Neutral density filters, which are more preferred filters, have approximately the same optical density across a broad spectral region and thus can be used at a variety of imaging wavelengths.

As an alternative to a discrete filter (46), dyes and/or pigments may be incorporated in the substrate and/or coversheet to accomplish the same purpose. This may be advantageous in that it eliminates the need to place a filter adjacent to the photosensitive element prior to imaging.

The filter must absorb enough reflected radiation to reduce the formation of secondary holograms yet must pass enough of the incident actinic radiation to form a hologram. Intensity can not be so reduced that the exposure time becomes unacceptably long. A filter that absorbs 25–99% of the incident radiation, measured at normal incidence, is preferred. A filter which absorbs 25–70% of the incident radiation, measured at normal incidence, is most preferred.

Photosensitive Element

Photosensitive element (40) is a holographic recording medium, i.e., a photosensitive material. The element typically has a substrate that provides dimensional stability to the photosensitive material. In some cases, such as when a photopolymerizable composition is selected as the photosensitive material, a coversheet generally will be used to protect the material.

Holograms are recorded by materials that produce a spatial pattern of varying refractive index, rather than optical density, when exposed to light. Among the more important materials are: silver halide emulsions, hardened dichromated gelatin, ferroelectric crystals, photochromics, photodichroics, and photopolymers. Holographic recording materials are described in a number of references, such as L.

Solymer and D. J. Cook, *Volume Holography and Volume Gratings*, Academic Press, New York, 1981, Chapter 10, pp 254–304 and by J. W. Gladden and R. D. Leighty, in "Recording Media", in *Handbook of Optical Holography*, H. J. Caufield, ed., Academic Press, New York, 1979, pp 277–298. Photopolymerizable compositions are disclosed in Haugh, U.S. Pat. No. 3,658,526 and in Fielding, U.S. Pat. Nos. 4,535,041 and 4,588,664.

Preferred photopolymerizable compositions are disclosed in Keys, U.S. Pat. No. 4,942,102 and Monroe, U.S. Pat. No. 4,942,112. In these compositions either the monomer or the binder contains one or more moieties selected from the group consisting of (1) an aromatic moiety selected from the group consisting of (i) substituted or unsubstituted phenyl, (ii) substituted or unsubstituted naphthyl, and (iii) substituted or unsubstituted heterocyclic aromatic moiety having up to three rings; (2) chlorine; (3) bromine and mixtures thereof; and the other constituent is substantially free of said moiety. Compositions in which the monomer contains the moiety are more preferred.

For systems in which the monomer contains the indicated group and the binder is free of the indicated group, preferred liquid monomers are: 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, 2-(1-naphthyloxy) ethyl acrylate, o-biphenyl methacrylate, o-biphenyl acrylate, and mixtures thereof. Preferred solid monomers, which may be used in combination with liquid monomers are: N-vinyl carbazole; 2,4,6-tribromophenyl acrylate or methacrylate; pentachlorophenyl acrylate or methacrylate; 2-naphthyl acrylate or methacrylate; 2-(2-naphthyloxy)ethyl acrylate or methacrylate; and mixtures thereof. Preferred binders for use in these systems are: cellulose acetate butyrate; poly(methyl methacrylate); poly(vinyl butyral); poly(vinyl acetate); and fluorine containing binders containing 3 to 25% by weight fluorine, such as copolymers of vinyl acetate with tetrafluoroethylene and/or hexafluoropropylene. For reflection holograms, the preferred binders are poly(vinyl butyral), poly(vinyl acetate), and copolymers of vinyl acetate with tetrafluoroethylene and/or hexafluoropropylene containing 3 to 25% by weight fluorine, such the 82:18 (mole %) vinyl acetate/tetrafluoroethylene copolymer.

For systems in which the binder contains the indicated group and the monomer is free of the indicated group, preferred monomers are: triethyleneglycol diacrylate and dimethacrylate, diethyleneglycol diacrylate, decanediol diacrylate, ethoxyethoxyethyl acrylate, and iso-bornyl acrylate. Preferred binders for these systems are: polystyrene and copolymers containing at least about 60% styrene. Particularly preferred binders include polystyrene, 75:25 poly(styrene/acrylonitrile), and 70:30 poly(styrene/methyl methacrylate), as well as mixtures thereof.

If crosslinking of the photopolymer is desired, up to about five weight percent of at least one multifunctional monomer containing two or more terminal ethylenically unsaturated groups may be incorporated into the composition. The polyfunctional monomer must be compatible with the other components of the composition and preferably is a liquid. Suitable multifunctional monomers include di-(2-acryloxyethyl)ether of bisphenol A, ethoxylated bisphenol A diacrylate, and the like. A preferred crosslinking is ethoxylated bisphenol A diacrylate.

The photopolymerizable compositions are substantially solid and are typically used as a layer applied to a dimensionally stable support. The composition may be directly coated onto the support by any conventional method, or may be cast as a film and laminated to the support by conventional methods. In either case the support generally provides only temporary dimensional stability for the photopolymer film prior to mounting on a substrate, and thus the support is releasable from the film. In some applications, however, the support may contain an absorbing dye or pigment, in which case it functions as an absorbing filter during imaging and is not removed before imaging. For some applications, however, it may be desired to retain the support as a permanent overcoat or protective layer for the photopolymer film, in which case the support and the photopolymer film may be permanently bonded. Polyethylene terephthalate film is a preferred support material.

The other side of the supported photopolymerizable layer may have a temporary release film (i.e., coversheet) such as polyethylene, polypropylene, polyethylene terephthalate, or the like. Similar to the support, the coversheet may contain an absorbing dye and/or pigment, in which case it functions as an absorbing filter during imaging. Conventional intermediate layers or coatings may be used to facilitate the adhesive and/or release characteristics needed for the preformed element.

The temporary release film typically is removed, and the photopolymerizable layer mounted on a substrate prior to exposure. The support may remain in place, acting as a coversheet, during exposure. The substrate transmits at least a portion of the actinic radiation. If the support remains in place during exposure, it must also transmit at least a portion of the actinic radiation. Exemplary substrates include: glass, polyethylene terephthalate film, poly(methyl methacrylate), polycarbonate, and cellulose triacetate. If the coversheet and/or support serve as absorbing filters, they are not removed prior to imaging.

In the preparation of holograms from these photopolymerizable compositions, the hologram is fixed by a second, overall exposure to actinic radiation. If the binder is poly(vinyl butyral), poly(vinyl acetate), or a copolymer of vinyl acetate with tetrafluoroethylene and/or hexafluoropropylene containing 3 to 25% by weight fluorine, the refractive index modulation of the hologram can be enhanced by heating to 100°–150° C. for about 0.5–1.5 hr following overall exposure.

The processes of this invention prepare reflection holograms with reduced noise. Reflection holograms can be used as holographic optical elements, as in, for example, head-up displays and holographic notch filters, and in displays.

A head-up display is a dual function optical element that simultaneously performs as an optical window (which transmits a nearly undistorted image) and as an analog of a conventional mirror or lens. A head-up display employs a holographic mirror mounted in front of an observer, such as the pilot of an aircraft or the operator of a motor vehicle. When information is projected onto the holographic mirror at the wavelength which the mirror reflects, the information is displayed on the mirror. However, the observer is able to see the outside world through the mirror since the holographic mirror reflects only a narrow band of radiation.

A holographic notch filter rejects a selected narrow band of radiation and provides maximum transmission outside the selected band. Strong absorption of a narrow, selected portion of the spectrum allows protection from discrete laser lines yet allows for good visibility since the rest of the spectrum passes through the filter. Holographic notch filters provide protection against laser radiation for eyes and for sensors and other optical instruments in both military and non-military applications.

Reflection holograms are suited for use in displays as in advertising or packaging; in security applications as on credit cards, bank notes, lottery tickets, and the like; and for information storage. Other specific uses for holograms prepared by the processes of this invention will be evident to those skilled in the art.

The advantageous properties of this invention can be observed by reference to the following examples which illustrate, but do not limit, the invention.

EXAMPLES

| GLOSSARY | |
|---|---|
| FC-430 | Fluorad ® FC-430, fluorinated nonionic surfactant; CAS 11114-17-3; 3M Company |
| JAW | Cyclopentanone, 2,5-bis[2,3,6,7-tetrahydro-1H,5H-benzo[i,j]quinolizin-9-yl)methylene]- |
| MMT | 4-Methyl-4H-1,2,4-triazole-3-thiol; CAS 24854-43-1 |
| NVC | N-Vinyl carbazole; 9-vinyl carbazole; CAS 1484-13-5 |
| o-Cl-HABI | -Biimidazole, 2,2'-bis[o-chlorophenyl]-4,4',5,5'-tetraphenyl-; CAS 1707-68-2 |
| Photomer ® 4039 | Phenol ethoxylate monoacrylate; CAS 56641-05-5; Henkel Process Chemical Company |
| Sartomer 349 | Ethoxylated bisphenol A diacrylate; CAS 24447-78-7; Sartomer Company, West Chester, PA |
| Vinac ® B-100 | Poly(vinylacetate); M.W. 350,000; CAS 9003-20-7; Air Products. |

General Procedures

Film Preparation

Coating solutions without sensitizing dye were prepared in amber bottles under yellow or red light by adding the components to the solvents while mixing with a mechanical stirrer until completely dissolved. All components were used as received from the suppliers without further purification. The sensitizing dye was added under red light and all subsequent operations on solutions and their resulting films were performed under red light only.

The following composition was prepared: 66.0% Vinac® B-100; 17.0% Photomer® 4039; 3.0% Sartomer 349; 7.9% NVC; 3.7% o-Cl HABI; 2.1% MMT; 0.08% JAW; and 0.2% FC-430 at about 17.5% total solids in 97:3 methanol/dichloromethane. The term "total solids" refers to the total amount of non-volatile components in the composition even though some of the components may be non-volatile liquids rather than solids at room temperature. The solution was die coated onto a support of about 50 micron thick clear polyethylene terephthalate film. An about 23 micron thick clear polyethylene terephthalate temporary release film was laminated to the photopolymerizable layer as it emerged from the drier to produce a coated film consisting of support, photopolymerizable layer, and temporary release layer. The photopolymerizable layer was about 25 microns thick. Coated films were stored in black polyethylene bags at room temperature until used.

Exposure and Evaluation

Coated film with both the support and temporary release film intact was cut into 10×13 cm sections. The coversheet was removed, and the resulting element mounted by laminating the soft, tacky photopolymerizable layer onto a clear glass plate to form a photosensitive element consisting of: support, photopolymerizable layer, and glass plate. The support was left in place during exposure and processing operations.

Samples were exposed as described below.

A holographic mirror was recorded in each photosensitive element by exposure with the 514.5 nm line of an argon-ion laser with a total intensity of about 0.8 mW/cm$^2$. The beams were about 2.0 cm in diameter. Total exposure was about 32 mJ/cm$^2$. The polarization of the beams was orientated perpendicular to the plane of incidence. Referring to FIG. 1, reflected beam (36) was incident on the photosensitive element (40) at an angle to the normal (42) alpha of about 37°. Reflected beam (38) was incident on the photosensitive element (40) at an angle to the normal (42) beta of about 59°. In cases in which an index matching fluid was employed, xylene was used as the index matching fluid.

After exposure, each film was overall exposed to ultraviolet and visible light for 120 sec using the output of a Theimer-Strahler #5027 mercury-arc photopolymer lamp (Exposure Systems Corp., Bridgeport, Conn.) mounted in a Douthitt DCOP-X (Douthitt Corp., Detroit, Mich.) exposure unit, and then thermally processed at 100° C. in a forced-air convection oven for 1 hr. The transmission spectrum of each holographic image was recorded from 500 to 660 nm using a Perkin Elmer model Lambda-9 spectrophotometer with the probe beam at normal incidence to the film. The holographic mirrors were also visually compared and evaluated.

Control Example A

The photosensitive element was exposed as described in the general procedures and illustrated in FIG. 2a. No filters or anti-reflection coated plates were used.

The absorption spectrum of the exposed and processed holographic mirror showed a strong absorption at about 570 nm, due to the holographic mirror. A moderately strong absorption at about 610 nm, and weaker absorptions at about 550 and 525 nm, due to secondary holographic mirrors, also were present.

Control Example B

The photosensitive element was exposed as described in the general procedures except that an anti-reflection coated plate was placed on each side of the element. This is illustrated in FIG. 2b. Each anti-reflection coated plate was coupled to the photosensitive element using xylene as the index matching fluid. The anti-reflection coated plates (CVI Laser Corporation, Albuquerque, N.Mex.) were coated for "S" and "P" polarization for minimum reflection at 488 and 514 nm at an incident angle of 45°.

The absorption spectrum of the resulting holographic mirror showed a strong peak at about 570 nm, a weak absorption at about 610 nm, and weaker absorptions at about 550 and 525 nm.

EXAMPLE 1

The photosensitive element was exposed as described in the general procedures except that a neutral density filter was placed on each side of the element. This is illustrated in FIG. 3a. Each neutral density filter was coupled to the photosensitive element using xylene as the index matching fluid. The neutral density filters (Catalog # ND-70, Hoya Optics, Inc., Fremont, Calif.) had an optical density of 0.5 measured at normal incidence (about 70% of the incident radiation absorbed at normal incidence).

The absorption spectrum of the resulting holographic mirror showed a strong peak at about 570 nm, due to the desired holographic mirror, and a weak absorption at about 610 nm, due to a secondary hologram. On visual inspection the mirror had fewer secondary holographic mirrors than holograms made without the use of filters.

EXAMPLE 2

The photosensitive element was exposed as described in the general procedures except that a both an anti-reflection coated plate and a neutral density filter was placed on each side of the element. The arrangement, which is illustrated in FIG. 3b, was as follows: anti-reflection coated plate, xylene, neutral density filter, xylene, photosensitive element, xylene, neutral density filter, xylene, and anti-reflection coated plate. The anti-reflection coated plates and neutral density filters were the same as those described in Control Example B and Example 1.

The absorption spectrum of the resulting holographic mirror showed a strong peak at about 570 nm, due to the desired holographic mirror, and a very weak absorption at about 610 nm, due to a secondary hologram. On visual inspection the mirror had fewer noise secondary holograms than holograms made without the use of filters.

Having described the invention, we now claim the following and their equivalents.

What is claimed is:

1. In a process for recording a reflection hologram wherein an object beam and a reference beam are incident on opposing surfaces of a photosensitive element to form a volume hologram therein, the improvement wherein formation of secondary holograms is suppressed by placement of a dimensionally stable index matched filter contiguous to a first one of the opposing surfaces of the photosensitive element during formation of the hologram, said filter being effective to absorb approximately 25 to 99% of the beam of radiation incident on the first surface that passes through the photosensitive element, measured at normal incidence, and pass a sufficient remainder of the beam into the photosensitive element to interact with the beam incident on a second one of the opposing surfaces to form a refection hologram in the photosensitive element.

2. The process of claim 1 wherein said photosensitive element is selected from the group consisting of photopolymerizable compositions, dichromated gelatin, and silver halide emulsions.

3. The process of claim 1 wherein a second dimensionally stable index matched filter is contiguous to a second one of the opposing surfaces of said photosensitive element during formation of the hologram, the second filter being effective to absorb approximately 25 to 99% of the beam of radiation incident on the second surface that passes through the photosensitive element, measured at normal incidence.

4. The process of claim 1 wherein said index matched filter is an absorption filter or a neutral density filter.

5. The process of claim 1 wherein said filter absorbs 25–70% of the beam of radiation incident on the first surface that passes through the photosensitive element, measured at normal incidence.

6. The process of claim 1 wherein an anti-reflection coating or index matched anti-reflection plate is contiguous to said index matched filter during formation of the hologram.

7. In a process for recording a reflection hologram wherein an object beam and a reference beam are incident on opposing surfaces of a photosensitive element to form a volume hologram therein, the improvement wherein the photosensitive element includes a recording medium and a substantially solid coversheet or support contiguous to a first surface of the recording medium during formation of the hologram, the coversheet or support having an external surface being a first one of the opposing surfaces of the photosensitive element, the coversheet or support containing a dye or pigment that functions as a dimensionally stable index matched filter which suppresses formation of secondary holograms in the recording medium during formation of the hologram, the filter being effective to (i) absorb approximately 25 to 99% of the beam of radiation incident on the first opposing surface that passes through the photosensitive element, measured at normal incidence, (ii) pass a sufficient remainder of the beam into the recording medium to interact with the beam incident on a second one of the opposing surfaces of the photosensitive element to form a refection hologram in the photosensitive element, and (iii) suppress the formation of secondary holograms in the recording medium.

8. The process of claim 7 wherein a second dimensionally stable index matched filter is contiguous to a second surface of the recording medium during formation of the hologram, the second filter being effective to absorb approximately 25 to 99% of the beam of radiation incident on a second one of the opposing surfaces that passes through the photosensitive element, measured at normal incidence.

9. The process of claim 8 wherein each one of the filters absorb 25–70% of the respective beams of radiation that pass through the photosensitive element, measured at normal incidence.

10. The process of claim 7 wherein said index matched filter is an absorption filter or a neutral density filter.

11. The process of claim 7 wherein an anti-reflection coating or index matched anti-reflection plate is contiguous to the coversheet or support during formation of the hologram.

* * * * *